Oct. 14, 1941.     R. HILL     2,258,680
FRONT CONTROL HOOD LATCH
Filed March 23, 1939     2 Sheets-Sheet 2
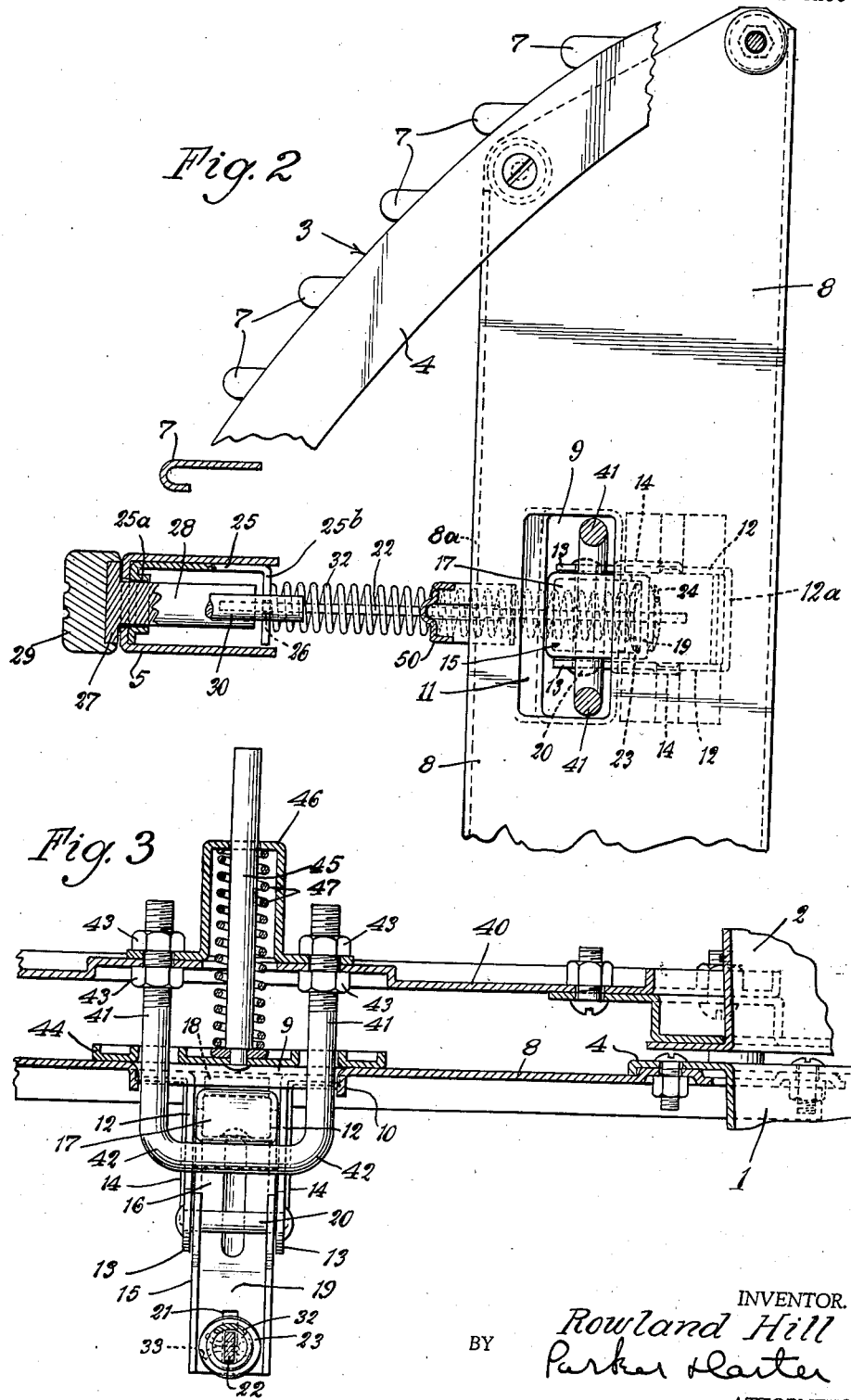
INVENTOR.
Rowland Hill
BY Parker Carter
ATTORNEYS.

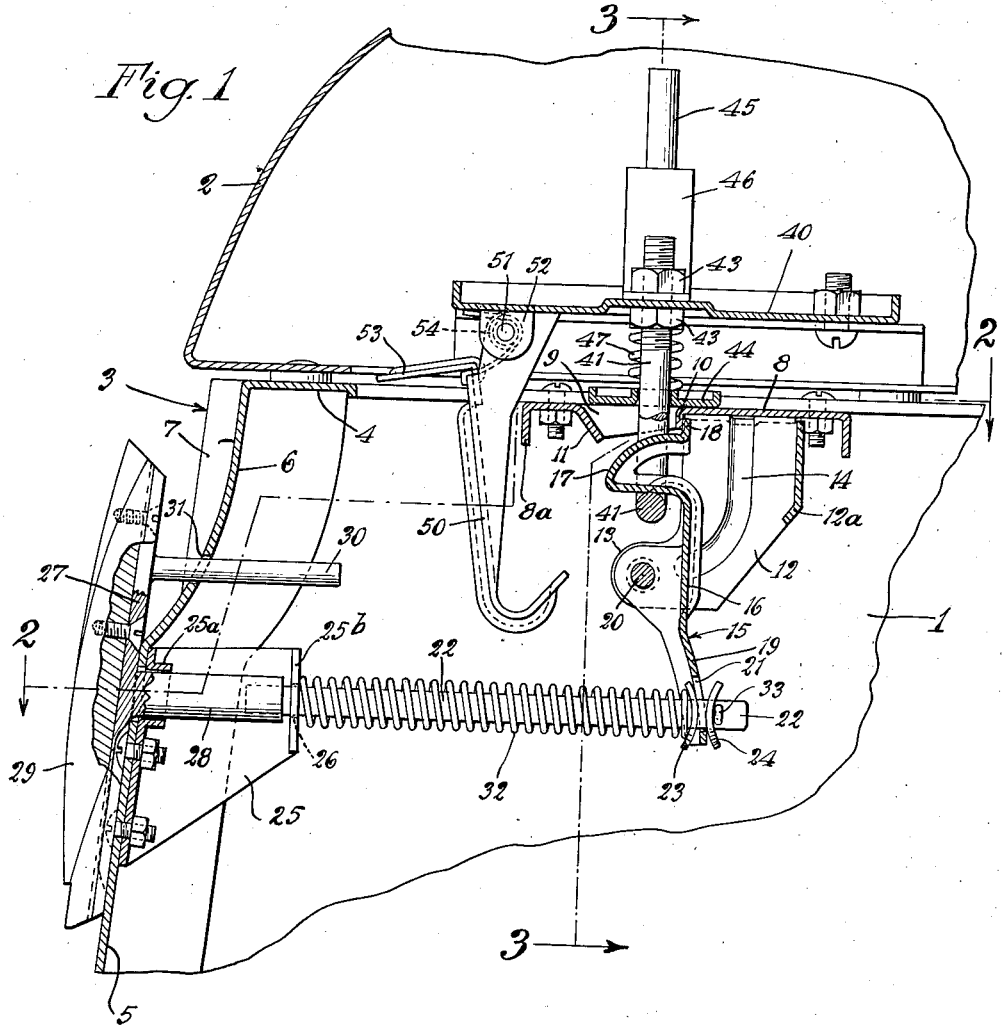

Patented Oct. 14, 1941

2,258,680

UNITED STATES PATENT OFFICE 2,258,680

FRONT CONTROL HOOD LATCH

Rowland Hill, Chicago, Ill., assignor to Chicago Forging & Manufacturing Company, Chicago, Ill., a corporation of Illinois Application March 23, 1939, Serial No. 263,650

1 Claim. (Cl. 292—127)

My invention relates to an improvement in latches and has for one purpose the provision of an improved latch for the closure of an automobile hood.

Another purpose is the provision of a latch assembly which shall be compact, easy to manufacture, and efficient in use.

Another purpose is the provision of improved latch means wherein the exterior operating handle is located in the front of an automobile hood or grille and may for example constitute or have associated with it an ornamental insignia, shield, or the like.

Another purpose is the provision of an improved actuating connection between the latch and exterior handle.

Another purpose is the provision of a latch and supporting means therefor which may be secured to or supported on the grille of the automobile, the exterior handle being also mounted on the grille.

Other purposes will appear from time to time in the course of the specification and claim.

I illustrate my invention more or less diagrammatically in the accompanying drawings wherein:

Fig. 1 is a vertical longitudinal section;

Fig. 2 is a section on the line 2—2 of Fig. 1; and

Fig. 3 is a section on the line 3—3 of Fig. 1.

Like parts are indicated by like characters throughout the specification and drawings.

Referring to the drawings, and for example to Fig. 1 and following, I generally indicates an automobile hood and 2 a closure therefor. The closure is preferably transversely and horizontally hinged at its rear end, the details of the hinge being not herein indicated, as they do not of themselves form part of the present invention. It will be realized that the hinging means may constitute a single fixed axis, or any suitable multiple structure may be employed in accordance with current practise.

Associated with the closure 2, I illustrate any suitable grille generally indicated as 3, which includes a generally horizontal type flange 4, a central downwardly extending portion 5, the upper portion of the member 5 being inwardly offset as at 6. 7 are any suitable individual grille elements.

Adjustably secured to the top flange 4 of the grille is a transversely extending generally horizontal supporting and latch aligning plate 8, which is provided with an aperture 9, the edges of which may be downwardly turned or flanged as at 10. Said flange includes a forward inclined portion 11, the purpose of which will later appear.

Any suitable brackets 12 may be mounted on the plate 8, each such bracket ending in a forwardly extending ear 13 and being reinforced by a channel offset as at 14. The brackets are connected by a rear wall 12—a which serves as a stop for the latch below described. Pivoted between the ears 13 is a latch structure generally indicated at 15, including transversely extending back member 16, a latch or nose 17, and a limit offset 18 adapted to engage the flange 10 and to limit the movement of the latch 17 toward locking position.

19 is a downward lever extension of the latch below the pivots 20 thereof. It is slotted at its lower end as at 21 to receive an actuating rod 22, upon which are arcuate engaging abutments 23, 24. These, taken in connection with the slot 21, permit the latch structure to rotate about its axis at 20 in response to a rectilinear movement of the rod 22 without any clamping or binding. The rod 22 in turn is guided in a bracket 25, secured to the grille member 5.

The bracket has a forward bearing sleeve 25—a unitary therewith, and a rear flange 25—b apertured to permit the passage of the rod 22. The sleeve 25—a and the aperture 26 of the flange 25—b constitute a pair of spaced guiding bearings.

27 indicates a plate secured to the enlarged inner end or portion 28 of the rod 22. Any suitable insignia or shield 29 may be secured thereto. One or more additional guiding pins 30 extend rearwardly from the plate 27 through any suitable aperture or apertures 31 in the member 6.

A spring 32 is coiled about the rod 22 and is compressed between the flange 25—b and the abutment 23. 33 is a limiting pin at the inner end of the rod 22 and adapted to limit the expansion of the spring 31 by limiting the outward movement of the abutment 24, the lever 19 and the abutment 23 along the rod 22. Thus, the expansion of the spring 32 normally holds the handle plate 27 in the position in which it is shown in Fig. 1, and normally thrusts the latch 17 into the latched position in which it is shown in Fig. 1. The operator, by inserting his fingers beneath the upper portion of the plate 27 and into the space between it and the rearwardly curved member 6 can grasp the handle plate 27 and move the rod 22 rectilinearly outwardly. The result is to compress the spring 32 and positively to move the latch 15, about the pivot 20, into released position.

Mounted on the closure 2 is any suitable transversely extending keeper plate 40. It is preferably adjustably mounted and may be screwed to the lower side of the closure 2 in any suitable manner. It may carry a stirrup or keeper 41, herein shown as a U-shaped member with rounded corners 42. This member is adjustably secured on the plate 40 by any suitable locknuts 43. Guided for movement on the vertical arms of the stirrup 41 is a thrust plate 44 further guided by a pin 45 passing through an upwardly guiding yoke 46.

47 is any suitable spring tending normally to thrust the plate 44 downwardly along the stirrup 41 and against the upper surface of the lower plate 8. It will be understood that the tendency of the spring 47 is, in the first place, to prevent rattling of the parts, and in the second place to tend to hold the closure 2 slightly upwardly from the hood in the event that the latching means are released.

The parts are preferably so adjusted that the transversely extending bottom portion of the stirrup 41 may be overridden by the latch nose 17, the latched position of the parts being illustrated in Fig. 1.

A supplemental safety lock is also provided in a form of a hook 50 pivoted as at 51 to ears 52 downwardly offset from the plate 40. 53 is a handle portion therefor, so located that after the closure 2 has been slightly lifted, the operator can insert his fingers and engage the member 53 and thereby rotate the hook 50 into inoperative position. If the closure 2 is raised, by wind pressure or otherwise, hook 50 will engage the flange of the lower plate 8 as at 8—8, and further upward movement of closure 2 will be prevented. A spring 54 normally holds the hook 50 in operative position as illustrated in Fig. 1.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a compact and efficient latch assembly, which includes the latch or nose 17, controlled by the outside handle 27 and the safety latch 50. In Fig. 1 the parts are shown in closed position, with the latch or nose 17 engaging the bottom of the stirrup 41. The latch 50 is held by the spring 54 in vertical alignment with the flange 8a of the plate 8, but is not performing a function, when the parts are in the position of Fig. 1.

When the operator wishes to open the hood, he puts his fingers behind the upper edge of the plate 27 and pulls the plate forwardly. This moves the rod 22 in its fixed axis and rotates the lever 19, thereby moving the nose or latch 17 into inoperative position and releasing the stirrup 41. The spring 47 tends to lift the closure 2 slightly. In any event, the operator inserts his hand under the forward edge of the hood closure and engages the handle 53 of the latch 50. Thereafter, in response to a unitary upward lifting movement of the hand, the latch 50 is moved to inoperative position and the hood closure is raised, and may be held in raised position by any suitable means. As soon as the operator releases the handle 27, the spring 32 expands and returns the latch 17 to the latched position, the member 18 serving as a stop to limit further movement, by its engagement with the flange 10.

The operator, when he wishes to close the hood, may drop it in place, and the stirrup 41 will override the latch or nose 17. As soon as it has cleared the bottom of the latch 17, then the spring 32 will be effective to snap the latch 17 back into position. The spring 54 holds the latch 50 at all times in effective position unless the operator positively engages the handle 53 and rotates the latch 50 into unlatched position. Thus, if for any reason the main latch 17 is not properly engaged, the latch 50 serves as a safety latch which prevents more than a slight raising of the closure 2. This is particularly advantageous, for instance where a filling station operator fails completely to close the closure 2. Then, when the car begins to move, the wind pressure, which might otherwise tend to raise the closure, can only lift it as far as the latch 50 will permit.

The inclined portion 11 adjacent the aperture 9 of plate 8 is to permit clearance and guidance for the stirrup 45, which does not descend in a vertically rectilinear course but in an arc, since it is rigidly mounted on a radially moving member, namely the hood closure. It may also be effective where a compound hinge is employed and, in other words, provide clearance and guidance for the stirrup 41 when, as the closure 2 is moved into closing position, the stirrup portion moves rearwardly as well as downwardly.

I claim:

In combination with an automobile hood having a front grille and a hood closure with a downwardly extending combined keeper and centering member, a latch support mounted on the hood and apertured to receive said keeper and centering member in guiding relationship, and means for holding said keeper and centering member against upward movement through said aperture, including a latch member mounted on said latch support for rotation about a generally horizontal transverse axis, said latch member including a keeper engaging arm extending upwardly above said axis but located below said aperture, and an actuating arm extending below such axis, a handle exteriorly positioned at the forward end of the hood and on the front grille, located below the junction between the hood and the hood closure, the grille being recessed to the rear of the handle for ready access of the hand to the handle, an actuating rod rearwardly extending from the handle, guiding means for the rod, a direct rocking connection between a lower portion of the actuating arm of the latch and an inner portion of the rod, yielding means adapted normally to rotate said latch toward latching position, the upper arm of the latch including a nose adapted to interpenetrate with the keeper in locking relationship, and a cam portion adapted to be overridden by the keeper when the keeper is moved downwardly toward locking position.

ROWLAND HILL.